United States Patent
Wu et al.

(10) Patent No.: US 8,428,147 B2
(45) Date of Patent: Apr. 23, 2013

(54) METHOD AND APPARATUS FOR DETECTION AND CONCEALMENT OF REFERENCE AND NON-REFERENCE VIDEO FRAMES

(75) Inventors: Zhenyu Wu, Plainsboro, NJ (US); Frederic Landais, Princeton, NJ (US); Purvin Bibhas Pandit, Somerset, NJ (US); Jill MacDonald Boyce, Manalapan, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1105 days.

(21) Appl. No.: 11/988,073

(22) PCT Filed: Jun. 6, 2006

(86) PCT No.: PCT/US2006/021890
§ 371 (c)(1),
(2), (4) Date: Jan. 5, 2009

(87) PCT Pub. No.: WO2007/018709
PCT Pub. Date: Feb. 15, 2007

(65) Prior Publication Data
US 2009/0175344 A1    Jul. 9, 2009

Related U.S. Application Data

(60) Provisional application No. 60/702,233, filed on Jul. 25, 2005.

(51) Int. Cl.
*H04N 7/12* (2006.01)
(52) U.S. Cl.
USPC ............. 375/240.26; 375/240.27; 375/240.28
(58) Field of Classification Search ............. 375/240.16, 375/240.26, 240.27, 240.28
See application file for complete search history.

(56) References Cited

U.S. PATENT DOCUMENTS

| | | | |
|---|---|---|---|
| 5,724,369 A | * | 3/1998 | Brailean et al. ............... 714/747 |
| 6,530,055 B1 | * | 3/2003 | Fukunaga ..................... 714/746 |

(Continued)

FOREIGN PATENT DOCUMENTS

| | | |
|---|---|---|
| WO | WO2004075554 | 9/2004 |
| WO | WO2005046072 | 5/2005 |

OTHER PUBLICATIONS

M.C. Hong, H. Schwab, L.P.Kondi, A.K. Katsaggelos; Error Concealment Algorithms for Compressed Video; Signal Processing: Image Communications, vol. 14, Nos. 6-8, pp. 437-492, 1999.

(Continued)

*Primary Examiner* — Eleni Shiferaw
*Assistant Examiner* — Hilary Branske
(74) *Attorney, Agent, or Firm* — Robert D. Shedd; Guy H. Eriksen

(57) ABSTRACT

There are provided method and apparatus for detecting and concealing reference and non-reference video frames. A video decoder includes an entropy decoder, an error detector, and an error concealer. The entropy decoder is for decompressing a video bitstream intended to have a fixed frame rate and parsing the decompressed video bitstream to find picture order counts for frames of the decompressed video bitstream. The error detector is for determining that a particular frame of the decompressed video bitstream is missing based upon the picture order counts. The error concealer is for concealing the particular frame. The method is accomplished by decompressing and parsing the video bitstream to find picture order counts for frames of the decompressed video bitstream and then determining that a particular frame of the decompressed video bitstream is missing based upon comparison of their associated picture order counts, and then concealing that particular frame.

20 Claims, 3 Drawing Sheets

U.S. PATENT DOCUMENTS

| | | | |
|---|---|---|---|
| 6,643,326 B1* | 11/2003 | Fukunaga et al. | 375/240.12 |
| 6,674,801 B1* | 1/2004 | Kim | 375/240.26 |
| 6,968,005 B2* | 11/2005 | Hannuksela | 375/240.01 |
| 2004/0161033 A1* | 8/2004 | Notoya et al. | 375/240.01 |
| 2004/0218816 A1 | 11/2004 | Hanuksela | |
| 2005/0008240 A1* | 1/2005 | Banerji et al. | 382/238 |
| 2005/0169303 A1* | 8/2005 | Toma et al. | 370/466 |
| 2006/0109805 A1* | 5/2006 | Malamal Vadakital et al. | 370/299 |
| 2006/0271990 A1* | 11/2006 | Rodriguez et al. | 725/118 |

OTHER PUBLICATIONS

J.M. Mitchell et al: "MPEG Video Compression Standard" 1996 Chapman & Hall, New York, XP002435390, p. 147, paragraph 8.5, p. 195, p. 202.

I. Richardson: "Frame and Picture Management" (Online) Jan. 2004, pp. 1-7, XP002435299 Retrieved from the Internet: URL:http://www.rgu.ac.uk/files/avc_picmanagement_draft1.pdf> [retrieved on Jun. 29, 2007], p. 1.

E. Quacchio et al: "Enhancing Whole-Frame Error Concealment with an Intra Motion Vector Estimator in H.264/avc" Acoustics, Speech and Signal Processing, 2005. Proceedings. (ICASSP '05) IEEE International Conference on Philadelphia, Pennsylvania, USA Mar. 18-23, 2005, Piscataway, NJ USA IEEE, Mar. 18, 2005 (pp. 329-332), XP01070643 ISBN:0-7803-8874-7, p. 330, paragraph 4—p. 331.

S. Bandyopadhyay et al: "Frame loss error concealment for H.264/AVC" ISO/IEC MPEG & ITU-T SG16 Q. 6, No. JVT-P072, Jul. 21, 2005, pp. 1-11, XP002435300, p. 1.

* cited by examiner

METHOD AND APPARATUS FOR DETECTION AND CONCEALMENT OF REFERENCE AND NON-REFERENCE VIDEO FRAMES

CROSS-REFERENCE TO RELATED APPLICATIONS

This application claims the benefit, under 35 U.S.C. §365 of International Application PCT/US2006/21890, filed Jul. 6, 2006, which was published in accordance with PCT Article 21(2) on Feb. 15, 2007 in English and which claims the benefit of United States provisional patent application No. 60/702,233, filed Jul. 25, 2005.

FIELD OF THE INVENTION

The present invention relates generally to video encoding and decoding and, more particularly, to methods and apparatus for the detection of lost non-reference video frames and the concealment of lost reference and non-reference video frames.

BACKGROUND OF THE INVENTION

Video content delivered through error-prone communication channels are subjected to errors introduced during transmission. Within many application infrastructures, transmission errors often result in losses of the data to be received by an application. For low bit-rate video transmission applications, for example 3GPP networks, each lost data unit usually corresponds to the loss of a coded frame at the application layer. If left untreated, such corrupted bitstream as presented to the video decoder can derail or even crash the decoding process. Therefore, mechanisms should be in place within the decoder to detect such losses.

Video frames can be divided into two types in H.264 bitstreams, reference frames and non-reference frames. The current H.264 decoder JM software can detect a lost reference frame by checking a variable called "frame_num" assigned to each reference frame. "frame_num" is incremented by 1 for the next reference frame, so when the gap between two consecutive "frame_num" is greater than 1, the decoder is aware that a lost reference frame occurred. In this case, the current decoder JM software stops any further decoding.

Moreover, the current H.264 decoder JM software cannot detect the loss of a non-reference frame. The decoder simply decodes the next available frame in the bitstream and skips the lost frame. Hence, the output video sequence has fewer frames and this can cause display speed jitter, which affects the final viewing experience.

SUMMARY OF THE INVENTION

These and other drawbacks and disadvantages of the prior art are addressed by the present invention, which is directed to methods and apparatus for the detection of lost non-reference video frames and the concealment of lost reference and non-reference video frames.

According to an aspect of the present invention, there is provided a video decoder. The video decoder includes an entropy decoder, an error detector, and an error concealer. The entropy decoder is for decompressing a video bitstream intended to have a fixed frame rate and parsing the decompressed video bitstream to find picture order counts for frames of the decompressed video bitstream. The error detector is for determining that a particular frame of the decompressed video bitstream is missing based upon the picture order counts. The error concealer is for concealing the particular frame.

According to another aspect of the present invention, there is provided a method for decoding a video bitstream intended to have a fixed frame rate. The method includes decompressing the video bitstream, parsing the decompressed video bitstream to find picture order counts for frames of the decompressed video bitstream, determining that a particular frame of the decompressed video bitstream is missing based upon the picture order counts, and concealing the particular frame.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
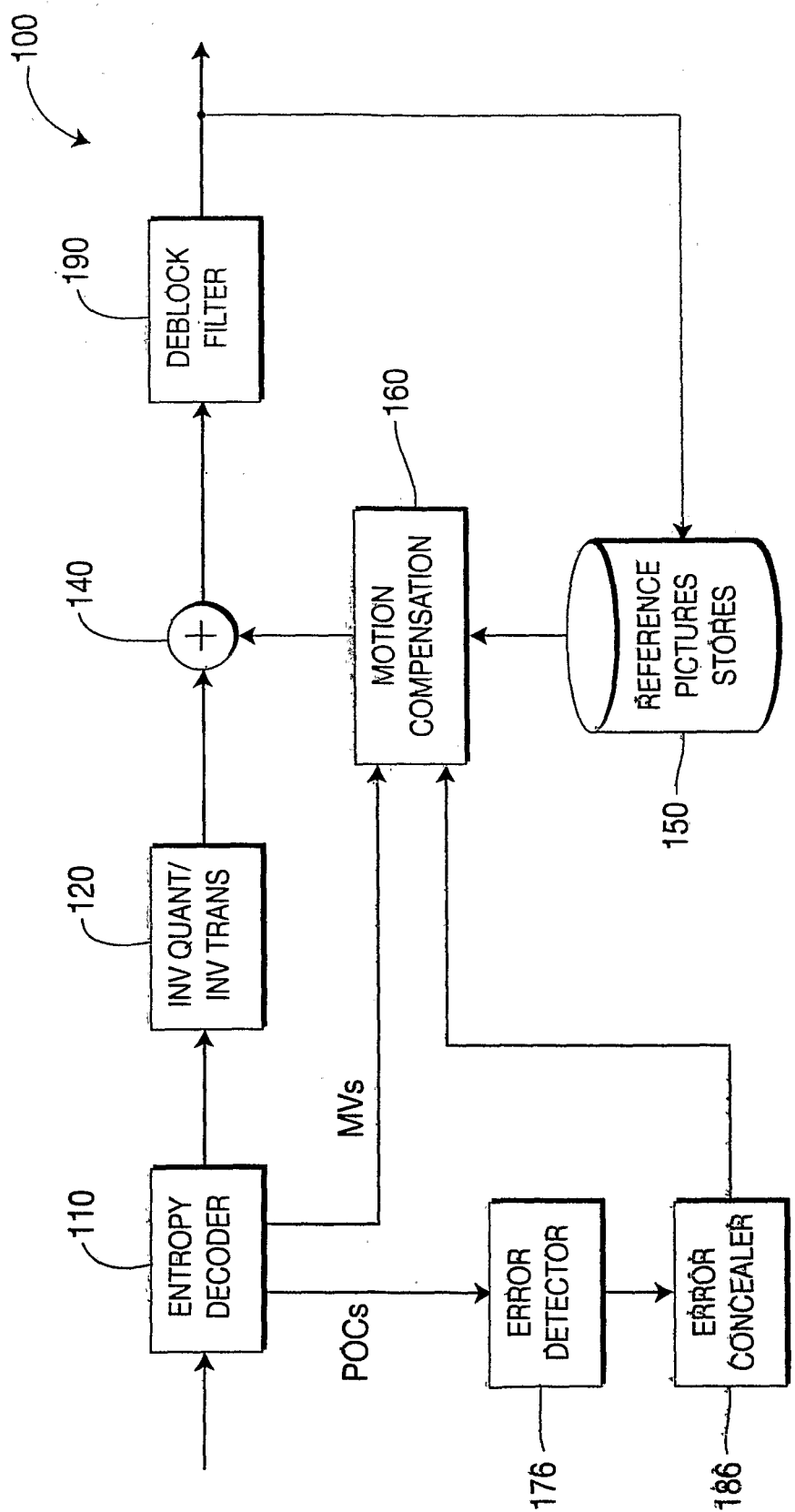
FIG. 1 shows a block diagram for an exemplary non-scalable video decoder to which the present principles may be applied.

The present invention is directed to methods and apparatus for the detection of lost non-reference video frames and the concealment of lost reference and non-reference video frames.

Thus, in accordance with the principles of our invention, a decoder and/or decoding method can be implemented to detect the loss of non-reference frames and corresponding functions can be invoked to conceal the lost non-reference frames. Moreover, in accordance with the present principles, a decoder and/or decoding method can be implemented to conceal reference frames as well. This detection and/or concealment of lost video frames leads to more stable video quality and bit rate, and better viewer satisfaction.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Turning to FIG. 1, a non-scalable video decoder is indicated generally by the reference numeral 100. The video decoder 100 includes an entropy decoder 110 for receiving a video sequence. A first output of the entropy decoder 110 is connected in signal communication with an input of an inverse quantizer/transformer 120. An output of the inverse quantizer/transformer 120 is connected in signal communication with a first input of a summing junction 140. The output of the summing junction 140 is connected in signal communication with a deblock filter 190. An output of the deblock filter 190 is connected in signal communication with reference picture stores 150. The reference picture stores 150 is connected in signal communication with a first input of a motion compensator 160. An output of the motion compensator 160 is connected in signal communication with a second input of the summing junction 140. A second output of the entropy decoder 110 is connected in signal communication with a second input of the motion compensator 160. A third output of the entropy decoder 110 is connected in signal communication with the input of an error detector 176. The output of the error detector 176 is connected in signal communication with the input of an error concealer 186. The output of the error concealer 186 is connected in signal communication as a third input of the motion compensator 180. The output of the deblock filter 190 is available as an output of the video decoder 100.

As noted above, methods and apparatus are provided for the detection of lost non-reference video frames and the concealment of lost reference and non-reference video frames. Advantageously, by detecting lost non-reference video frames in accordance with the principles of the present invention, the case is avoided where the decoder simply skips the lost frame possibly causing display speed jitter and affecting the final viewing experience. Moreover, any of lost reference video frames and lost non-reference video frames may be concealed in accordance with the principles described herein.

During the normal decoding process of an H.264 bitstream, the decoder maintains a picture order count (POC) variable for each coded picture, including both reference and non-reference pictures. POC was originally designed for source decoding purposes, such as to derive motion vectors in temporal direct mode, or weighted prediction in B slices. However, in accordance with the principles of the present invention, POC can also be used to detect a lost non-reference frame, if the coded video bitstream uses a fixed frame rate.

In a valid H.264 bitstream, each frame has its own POC value, starting from 0 for an instantaneous decoding refresh (IDR) frame of a group of pictures (GOP). We define the POC gap between a pair of POC values as follows:

$$POC\ Gap = POC_{Frame\ 1} - POC_{Frame\ 2}$$

Within each GOP, the POC gap typically remains the same for two temporally consecutive frames 1 and 2. Thus, if a POC gap is specified and known to the decoder, the decoder can check whether a frame is lost. After the decoding process, because of possible out-of-order coding for B pictures, the check is performed whenever the decoder is ready to output a decoded frame to a file or to display. The decoder calculates the POC gap between two temporally adjacent decoded frames. If the value does not equal the specified POC gap, the decoder is aware that there are frame(s) lost between the two frames. Since the lost reference frames are detected by the "frame_num" variable, this method based on POC gap is used exclusively for non-reference frames.

When a frame is lost, a "motion-copy" operation can be called to conceal the lost frame. With "motion-copy", the motion field of a specified reference frame is copied to the lost frame. For example, the motion vector of each macroblock (MB) or MB partition from the reference frame is copied to the co-located structure in the lost frame. Moreover, since multiple reference frames are allowed in H.264, the reference index associated with each motion vector in the reference frame is also copied. After the above steps, the normal motion compensation procedure in the decoder is called for to reconstruct the lost frame.

One issue that arises with "motion-copy" is that in the reference frame, some MBs or MB partitions may be coded in intra mode. When this happens, there are no motion vectors or reference indices associated with these regions. Effectively, these regions create "holes" in the motion field from which motion vectors are to be copied. One way to solve the problem is to assign (0,0) value to these lost motion vectors in the lost frame. However, when the field contains a lot of motion, the field may yield concealment artifact(s) in the concealed frame as well as future frames because of error propagation. This degrades the decoded video quality.

According to the principles of the present invention, we predict the lost motion information of these regions based on their spatially available neighbors. Specifically, the motion information of such a region is obtained following the same decoding procedure as SKIP mode. In other words, the motion vector of the region is predicted by median filtering the motion vectors of specific spatially neighboring regions. At the same time, the reference index of the motion vector of the region in the lost frame is assigned to the immediately previous reference frame, which is the same as SKIP mode decoding.

In "motion-copy", the reference frame can be any frame available in the decoder buffer which carries motion information. Thus, even if an IDR frame is lost, as long as it is not the first frame in the bitstream, it can still be concealed with "motion-copy" by specifying a reference frame available in the decoder buffer, possibly from the previous GOP.

Figure 2A:
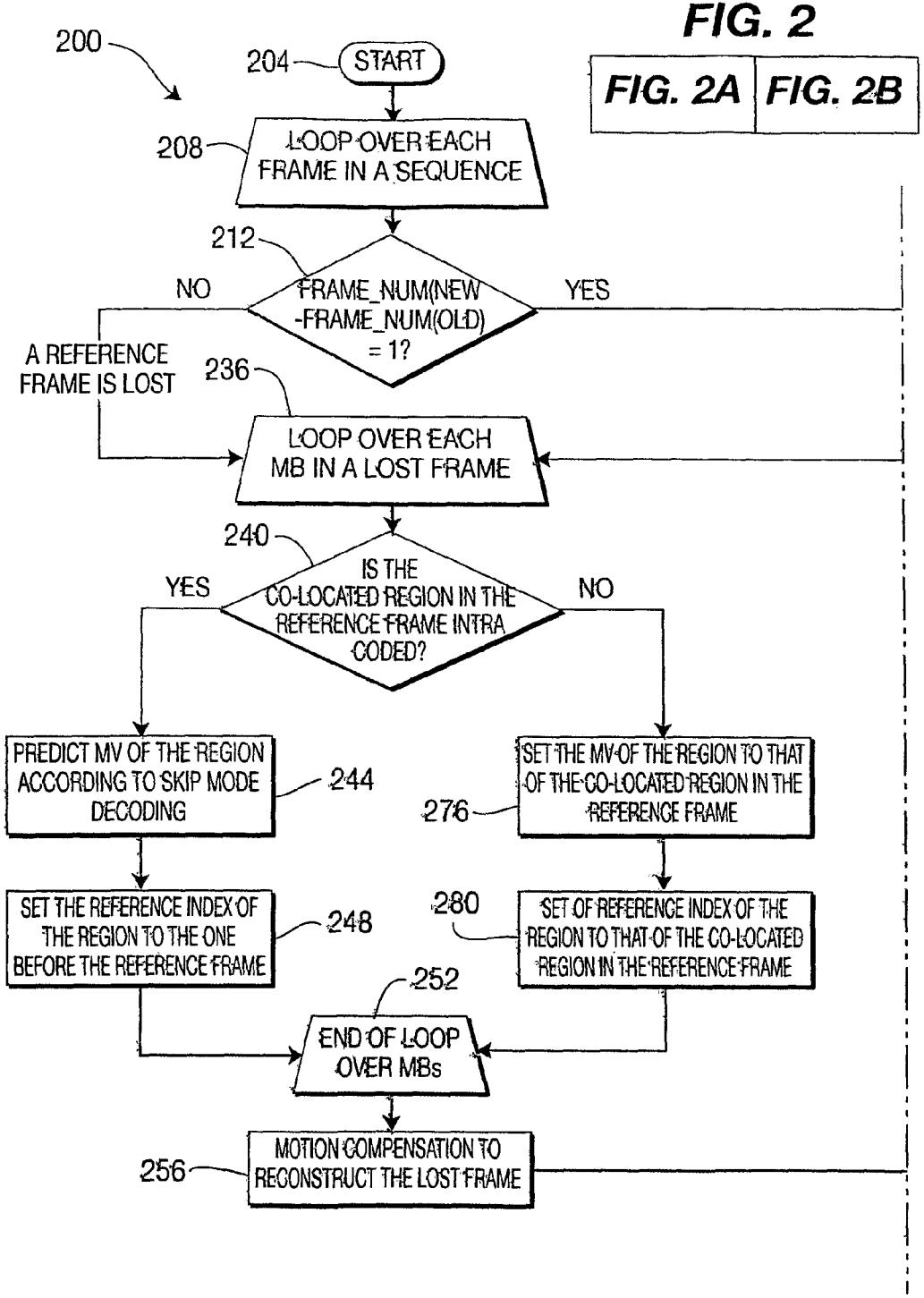
FIG. 2 shows a flow diagram for an exemplary method for decoding a video sequence, in accordance with the principles of the present invention.
Figure 2B:
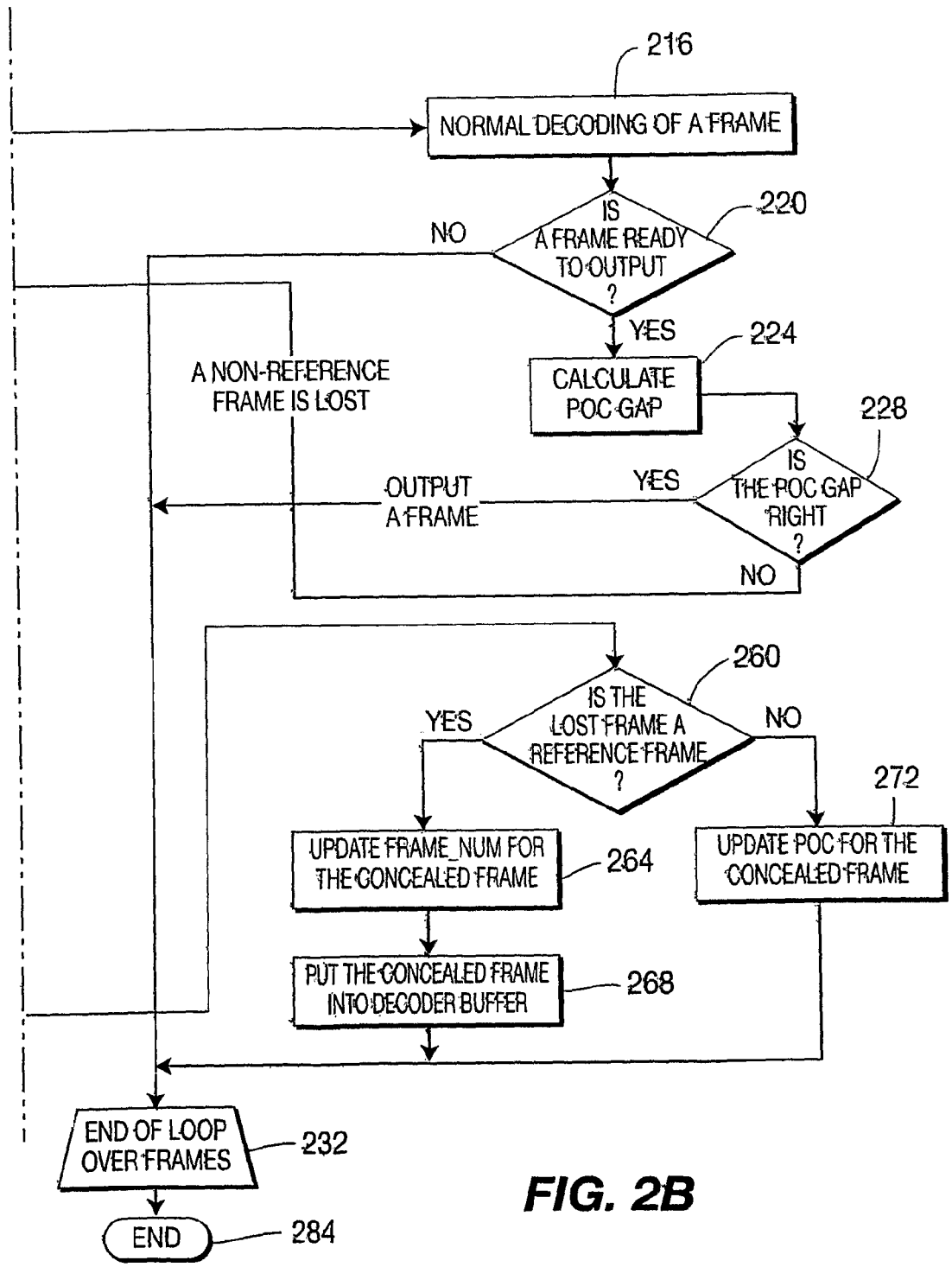

Turning to FIG. 2, a method for decoding a video sequence is indicated generally by the reference numeral 200. The method 200 is capable of detecting reference frames as well as non-reference frames and concealing lost frames. When a frame is lost, the method utilizes a modified "motion-copy" operation to perform the concealment. Compared to current decoding schemes, the extra complexity incurred by the two improvements proposed in this invention, namely the calculation of the POC gap and the prediction of the motion information for those intra-coded regions in a reference frame, is insignificant.

The method includes a start block 204 that passes control to a loop limit block 208. The loop limit block 208 begins a loop over each frame in the video sequence, and passes control to a decision block 212. The decision block 212 determines whether or not the frame number of the new frame minus the frame number of the old (immediately preceding) frame is equal to one. If so, then control is passed to a function block 216. Otherwise, control is passed to a loop limit block 236.

The function block 216 performs normal decoding of a current frame, and passes control to a decision block 220. The decision block 220 determines whether or not the current frame is ready to be output for display. If so, then control is passed to a function block 224. Otherwise, control is passed to a loop limit block 232 that ends the loop over each frame.

The function block 224 calculates the picture order count (POC) gap, and passes control to a decision block 228. The decision block 228 determines whether or not the POC gap is correct. If so, then control is passed to the loop limit block 232. Otherwise, control is passed to the loop limit block 236.

The loop limit block 236 begins a loop over each macroblock in a lost frame, and passes control to a decision block 240. The decision block 240 determines whether or not the co-located region in the reference frame is intra coded. If so, then control is passed to a function block 244. Otherwise, control is passed to a function block 276.

The function block 244 predicts the motion vector of the region according to skip mode decoding, and passes control to a function block 248. The function block 248 sets the reference index of the region to the one before the reference frame, and passes control to a loop limit block 252.

If the decision block 240 passes control to function block 276, then the MV is set to that of the co-located region in the reference frame and control is passed to function block 280. The function block 280 sets the reference index of the region to that of the co-located region in the reference frame, and then passes control to loop limit block 252.

The loop limit block 252 ends the loop over each of the macroblocks in the lost frame, and passes control to a function block 256. The function block 256 performs motion compensation to reconstruct the lost frame, and passes control to a decision block 260. The decision block 260 determines whether or not the lost frame is a reference frame. If so, then control is passed to a function block 264. Otherwise, control is passed to a function block 272. When control is passed to function block 272, the POC is updated for the concealed frame and control is passed to loop limit block 232.

The function block 264 updates the frame_num for the concealed frame, and passes control to a function block 268. The function block 268 puts the Concealed frame into the decode buffer, and passes control to the loop limit block 232.

The loop limit block 232 passes control to an end block 284.

A description will now be given of some of the many attendant advantages/features of the present invention, some of which have been mentioned above. For example, one advantage/feature is a video decoder that includes an entropy decoder, an error detector, and an error concealer. The entropy decoder is for decompressing a video bitstream intended to have a fixed frame rate and parsing the decompressed video bitstream to find picture order counts for frames of the decompressed video bitstream. The error detector is for determining that a particular frame of the decompressed video bitstream is missing based upon the picture order counts. The error concealer is for concealing the particular frame. Another advantage/feature is the video decoder as described above, wherein the error detector determines that the particular frame is lost based on a gap in the picture order counts between temporally adjacent frames of the decompressed video bitstream. Yet another advantage/feature is the video decoder as described above, wherein the error detector determines that the particular frame is lost by determining a picture order count gap between temporally adjacent frames, and indicating the particular frame as lost when the picture order count gap is greater than a threshold. Moreover, another advantage/feature is the video decoder as described above, wherein the error concealer conceals the particular frame using a frame repeat procedure. Further, another advantage/feature is the video decoder as described above, wherein the error concealer conceals the particular frame by deriving motion information for a block in the particular frame from a co-located block in a previously coded frame. Also, another advantage/feature is the video decoder that derives the motion information for the block in the particular frame from the co-located block in the previously coded frame as described above, wherein the error concealer derives a reference index for use for the block in the particular frame from a reference index of the co-located block in the previously decoded frame. Additionally, another advantage/feature is the video decoder that derives the motion information for the block in the particular frame from the co-located block in the previously coded frame as described above, wherein the error concealer conceals the particular frame by instead deriving the motion information for the block in the particular frame from motion vectors of spatially available neighbors of the co-located block in the previously coded frame, when the co-located block in the previously coded frame is intra coded. Additionally, another advantage/feature is the video decoder that instead derives the motion information for the block in the particular frame from the motion vectors of the spatially available neighbors of the co-located block in the previously coded frame when the co-located block in the previously coded frame is intra coded as described above, wherein the error concealer derives the motion information for the block in the particular frame by applying a median filter to the motion vectors of the spatially available neighbors of the co-located block in the previously coded frame. Moreover, another advantage/feature is the video decoder that instead derives the motion information for the block in the particular frame from the motion vectors of the spatially available neighbors of the co-located block in the previously coded frame when the co-located block in the previously coded frame is intra coded as described above, wherein the motion information for the block in the particular frame is obtained using SKIP mode decoding. Further, another advantage/feature is the video decoder that instead derives the motion information for the block in the particular frame using SKIP mode decoding when the co-located block in the previously coded frame is intra coded as described above, wherein the SKIP mode decoding is performed according to the International Telecommunication Union, Telecommunication Sector (ITU-T) H.264 standard. Also, another advantage/feature is the video decoder as described above, wherein the error detector updates a picture order count of the particular frame. One or more of the above-listed advantages/features may be associated with various embodiments of the present invention.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An apparatus, comprising:
   a video decoder including at least a hardware memory having:
   an entropy decoder for decompressing a video bitstream and parsing the decompressed video bitstream to find picture order counts for frames of the decompressed video bitstream;
   an error detector for determining that a particular non-reference frame of the decompressed video bitstream is missing based upon comparison of the picture order counts; and
   an error concealer for concealing the particular non-reference frame;
   wherein said error detector determines that the particular non-reference frame is missing based on a gap in the picture order counts between temporally adjacent frames of the decompressed video bitstream.

2. The apparatus of claim 1, wherein said error detector determines that the particular non-reference frame is missing by determining a picture order count gap between temporally adjacent frames, and indicating the particular non-reference frame as lost when the picture order count gap is greater than a threshold.

3. The apparatus of claim 1, wherein said error concealer conceals the particular non-reference frame using a frame repeat procedure.

4. The apparatus of claim 1, wherein said error concealer conceals the particular non-reference frame by deriving motion information for a block in the particular non-reference frame from a co-located block in a previously coded frame.

5. The apparatus of claim 4, wherein said error concealer derives a reference index for use for the block in the particular non-reference frame from a reference index of the co-located block in the previously decoded frame.

6. The apparatus of claim 4, wherein said error concealer conceals the particular non-reference frame by instead deriving the motion information for the block in the particular non-reference frame from motion vectors of spatially available neighbors of the co-located block in the previously coded frame, when the co-located block in the previously coded frame is intra coded.

7. The apparatus of claim 6, wherein said error concealer derives the motion information for the block in the particular non-reference frame by applying a median filter to the motion vectors of the spatially available neighbors of the co-located block in the previously coded frame.

8. The apparatus of claim 6, wherein the motion information for the block in the particular non-reference frame is obtained using SKIP mode decoding.

9. The apparatus of claim 8, wherein the SKIP mode decoding is performed according to the International Telecommunication Union, Telecommunication Sector (ITU-T) H.264 standard.

10. The apparatus of claim 1, wherein said error detector updates a picture order count of the particular non-reference frame.

11. In a video decoder, a method for decoding a video bitstream comprising:
   decompressing the video bitstream;
   parsing the decompressed video bitstream to find picture order counts for frames of the decompressed video bitstream;
   determining that a particular non-reference frame of the decompressed video bitstream is missing based upon comparison of their associated picture order counts; and
   concealing the particular non-reference frame;
   wherein said determining step determines that the particular non-reference frame is missing based on a gap in the picture order counts between temporally adjacent frames of the decompressed video bitstream.

12. The method of claim 11, wherein said determining step determines that the particular non-reference frame is missing by determining a picture order count gap between temporally adjacent frames, and indicating the particular non-reference frame as lost when the picture order count gap is greater than a threshold.

13. The method of claim 11, wherein said concealing step conceals the particular non-reference frame using a frame repeat procedure.

14. The method of claim 11, wherein said concealing step conceals the particular non-reference frame by deriving motion information for a block in the particular non-reference frame from a co-located block in a previously coded frame.

15. The method of claim 14, wherein said concealing step derives a reference index for use for the block in the particular non-reference frame from a reference index of the co-located block in the previously decoded frame.

16. The method of claim 14, wherein said concealing step conceals the particular non-reference frame by instead deriving the motion information for the block in the particular non-reference frame from motion vectors of spatially available neighbors of the co-located block in the previously coded frame, when the co-located block in the previously coded frame is intra coded.

17. The method of claim 16, wherein said concealing step derives the motion information for the block in the particular non-reference frame by applying a median filter to the motion vectors of the spatially available neighbors of the co-located block in the previously coded frame.

18. The method of claim 16, wherein the motion information for the block in the particular non-reference frame is obtained using SKIP mode decoding.

19. The method of claim 18, wherein the SKIP mode decoding is performed according to the International Telecommunication Union, Telecommunication Sector (ITU-T) H.264 standard.

20. The method of claim 11, further comprising updating a picture order count of the particular non-reference frame.

* * * * *